(12) United States Patent
Bueermann

(10) Patent No.: US 11,523,561 B2
(45) Date of Patent: Dec. 13, 2022

(54) ARRANGEMENT FOR CONTROLLING THE OPERATION OF A DRAPER BELT HEADER

(71) Applicant: DEERE & COMPANY, Moline, IL (US)

(72) Inventor: Martin Bueermann, Beckingen (DE)

(73) Assignee: DEERE & COMPANY, Moline, IL (US)

( * ) Notice: Subject to any disclaimer, the term of this patent is extended or adjusted under 35 U.S.C. 154(b) by 565 days.

(21) Appl. No.: 16/665,042

(22) Filed: Oct. 28, 2019

(65) Prior Publication Data
US 2020/0128745 A1 Apr. 30, 2020

(30) Foreign Application Priority Data
Oct. 29, 2018 (DE) .......................... 102018218442.9

(51) Int. Cl.
| | | |
|---|---|---|
| *A01D 61/00* | (2006.01) | |
| *A01D 61/02* | (2006.01) | |
| *A01D 75/28* | (2006.01) | |
| *A01D 41/127* | (2006.01) | |
| *A01D 41/02* | (2006.01) | |
| *B65G 43/00* | (2006.01) | |

(52) U.S. Cl.
CPC ......... *A01D 61/006* (2013.01); *A01D 61/008* (2013.01); *A01D 61/02* (2013.01); *A01D 41/02* (2013.01); *A01D 41/127* (2013.01); *A01D 61/002* (2013.01); *A01D 75/287* (2013.01); *B65G 43/00* (2013.01); *B65G 2203/0291* (2013.01)

(58) Field of Classification Search
CPC .... A01D 61/006; A01D 61/02; A01D 61/008; A01D 61/002; A01D 57/20; A01D 41/141; A01D 41/127; A01D 41/02; B65G 2203/0291; B65G 43/00
See application file for complete search history.

(56) References Cited

U.S. PATENT DOCUMENTS

| | | | | |
|---|---|---|---|---|
| 5,527,218 | A | * | 6/1996 | Van den Bossche ... A01F 29/14 460/119 |
| 8,087,224 | B1 | * | 1/2012 | Goers .................... A01D 57/20 56/153 |
| 8,186,136 | B2 | | 5/2012 | Eick et al. |
| 9,894,834 | B2 | * | 2/2018 | van Vooren ......... A01D 41/127 |

(Continued)

FOREIGN PATENT DOCUMENTS

| | | | | |
|---|---|---|---|---|
| AU | 2014201158 B2 | * | 6/2017 | ........... A01D 41/141 |
| CA | 3079457 A1 | * | 10/2020 | ........... A01D 41/141 |

(Continued)

*Primary Examiner* — Arpad F Kovacs
(74) *Attorney, Agent, or Firm* — Taft Stettinius & Hollister LLP; Stephen F. Rost

(57) ABSTRACT

An arrangement for controlling the operation of a draper belt header of a combine harvester includes a central belt conveyor of the draper belt header having a drive for operably driving the conveyor and two outer belt conveyors attached to a feeder house of the combine harvester. The feeder house has a controllable height which may be controllably adjusted by an actuator. The arrangement further includes a control unit operable to stop the drive of the central belt conveyor or move it into a reversing mode if the feeder house is being raised by the actuator.

20 Claims, 3 Drawing Sheets

(56) References Cited

U.S. PATENT DOCUMENTS

| | | | | |
|---|---|---|---|---|
| 10,412,887 B2* | 9/2019 | Füchtling | ............... | A01D 61/02 |
| 11,304,370 B2* | 4/2022 | Trowbridge | ......... | A01D 75/187 |
| 2008/0271426 A1* | 11/2008 | Lohrentz | ................ | A01D 41/14 |
| | | | | 56/153 |
| 2008/0276590 A1* | 11/2008 | Sauerwein | ............ | A01D 41/14 |
| | | | | 56/153 |
| 2009/0277144 A1* | 11/2009 | Honas | .................... | A01D 57/20 |
| | | | | 56/153 |
| 2009/0277145 A1* | 11/2009 | Sauerwein | ........... | A01D 41/141 |
| | | | | 56/208 |
| 2009/0277146 A1* | 11/2009 | Sauerwein | ............ | A01D 57/20 |
| | | | | 56/208 |
| 2009/0277147 A1* | 11/2009 | Honas | .................... | A01D 41/14 |
| | | | | 56/208 |
| 2009/0277148 A1* | 11/2009 | Sethi | ...................... | A01D 57/20 |
| | | | | 56/208 |
| 2013/0091819 A1* | 4/2013 | Deneault | .............. | A01D 41/141 |
| | | | | 701/50 |
| 2018/0199508 A1* | 7/2018 | Mueller | ............... | A01D 43/077 |
| 2019/0230857 A1* | 8/2019 | Thomson | ............ | A01D 41/141 |

FOREIGN PATENT DOCUMENTS

| | | | | |
|---|---|---|---|---|
| DE | 102013206515 A1 | 11/2013 | | |
| EP | 1380202 A1 | 1/2004 | | |
| EP | 1419688 A1 | 5/2004 | | |
| EP | 1576870 A1 | 9/2005 | | |
| EP | 1721509 A2 * | 11/2006 | ........... | A01D 41/141 |
| WO | 20120166947 A1 | 12/2012 | | |

* cited by examiner

ARRANGEMENT FOR CONTROLLING THE OPERATION OF A DRAPER BELT HEADER

RELATED APPLICATIONS

This application claims priority to German Patent Application Ser. No. 102018218442.9, filed Oct. 29, 2018, the disclosure of which is hereby incorporated by reference in its entirety.

FIELD OF THE DISCLOSURE

The present disclosure relates to an arrangement for controlling the operation of a draper belt header of a combine harvester, and in particular wherein the draper belt header is provided with a central belt conveyor and two outer belt conveyors and is attached to a feeder house of the combine harvester which is height controllable and can be raised by an actuator.

BACKGROUND

Draper headers, where the harvested crop is captured by a reel and conveyed rearward so that it can be severed from the roots remaining in the ground by a cutter bar, are usually used when harvesting grain. Cross conveying the severed harvested crop is effected in the case of one type of draper header by a cross-feeding auger, in the central region of which discharging conveyors in the form of controlled fingers are provided in order to transfer the harvested crop into the feeder house of the combine harvester. In the case of another type of draper header which is designated as a draper belt header, the cross-feeding auger is replaced by outer conveyor belts which convey the cut-off harvested crop in an overshot manner to the center of the draper header, where it is conveyed rearward by a central conveyor belt to the discharge opening of the draper header and there passes into the feeder house. A conveying drum provided with fingers can be arranged above the discharge opening (e.g., DE 10 2013 206 515 A1).

The central belt conveyor also operates in an overshot manner. A pan, which is to prevent harvested crop which passes into the interior of the belt conveyor and onto its underside falling onto the field, is arranged on its underside. Consequently, quantities of harvested crop, which also contain considerable amounts of grain, are gradually collected in the pan during the harvesting operation. The central belt conveyor continuously discharges the harvested crop forward in the harvesting mode. The harvested crop, discharged forward by the central belt conveyor, is entrained as long as harvested crop still comes in from the front by the harvested crop running in from the front and passes onto the central belt conveyor again and is finally pulled into the feeder house. If the draper header is raised at the headland, however, the material running in from the front drops, which results in the central belt conveyor discharging part of the collected harvested crop forward and it falling onto the soil. As a result, on the one hand unwanted grain losses are generated and on the other hand grain is raised in an unwanted manner at the end of the field.

A reversing, known per se, of all belt conveyors of a draper belt header on the basis of an operator input (see e.g., U.S. Pat. No. 8,186,136 B2 and U.S. Publication No. 2018/0104937 A1) is known per se but is cumbersome for an operator and can, as no further operation of the feeder house is provided in the normal conveying direction (but also a reversing), at best result in the material accumulated below the central conveyor belt being ejected onto the field, which does not solve the problem described.

EP 1 419 688 A1 describes a corn header for harvesting whole plants for use with a forage harvester which is reversed automatically during raising in order to eject corn leaves suspended on the outwardly pointing conveying and guiding elements of an endless conveyor which serve for cutting off and discharging the harvested crop. Here it is consequently a matter of freeing the cutting and conveying elements of the endless conveyor on which the plant parts are caught from the leaves as a result of reversing.

EP 1 576 870 A1 proposes driving a crop attachment and an infeed conveyor of a harvesting machine automatically slower at the headland than in the harvesting operation in order to save fuel. The slowing down of the infeed conveyor is effected in a time delayed manner in relation to the slowing down of the crop attachment in order to move all the material taken-in into the harvesting machine still at the same speed. Stopping or even reversing the crop attachment is not provided.

WO 2012/166947 A1 describes an automatic unblocking procedure for a combine harvester where, in the event of reversing the harvested crop processing unit of the combine harvester, all the conveyor belts of the draper belt header are first of all stopped. If the reversing operation of the harvested crop processing unit lasts longer than a certain time, the central belt conveyor of the draper belt header is also reversed. Once the reversing of the harvested crop processing unit has ended, the central conveyor is first of all driven in the normal direction again and after a predetermined time has expired, finally the outer belt conveyors are also set in motion. The method of action cannot solve the problem described either.

Thus, there is a need to provide an arrangement for controlling the operation of a draper belt header that is user-friendly and avoids or reduces the losses when it is raised.

SUMMARY

In the present disclosure, an arrangement for controlling the operation of a draper belt header of a combine harvester, which is provided with a central belt conveyor and two outer belt conveyors and is attached to a feeder house of the combine harvester which is height controllable and can be raised by means of an actuator, includes a control unit which is operable to stop a drive of the central belt conveyor or to move it into a reversing mode in the event of the feeder house being raised.

It is proposed to couple a stopping or a reversing of the central belt conveyor automatically with the raising of the feeder house. In this way, the harvested crop losses otherwise arising as a result of the harvested crop accumulated below the central belt conveyor during raising are avoided for, after the stopping, the harvested crop remains on the underside of the central belt conveyor or it is moved rearward into the feeder house by the reversing central belt conveyor and from the central belt conveyor into the combine harvester. The operator does not need to intervene.

The actuator of the feeder house is operable, in particular, to raise the feeder house out of a working position into a headland position, and the control unit is able to react to the raising into the headland position with the stopping or reversing operation of the central belt conveyor.

In another embodiment, the stopping or the reversing of the central belt conveyor is already carried out on the basis of a raising of the feeder house to a height (lying below a headland position) which is, however, high enough so that it can be assumed that no more harvested crop is to be taken in.

The control unit can be operable to actuate the drive in dependence on an adjustment command given in particular manually to the actuator or in dependence on a position of the feeder house detected by a sensor or in dependence on an output of a headland management system. In a manner known per se, on the basis of an operator input or an automatic identification of the relative position of the combine harvester in relation to the headland, e.g., by way of a stored map and a satellite-based position determining system or with an electro-optical device which recognizes the headland optically (e.g., with a camera or a laser range finder), the headland management system is able to carry out a headland sequence where various actuators are actuated automatically one after another in order to make the turning operation at the headland easier for the user, where applicable including the steering of the combine harvester. To this end, reference is made as an example to the disclosure in EP 1 380 202 A1, which is hereby incorporated by reference. At a suitable position on the field, the headland management system accordingly gives an adjustment command to the actuator of the feeder house in order to raise this latter, and in a chronological or local context with the adjustment command, an instruction to the control unit which causes it to stop or reverse the drive of the central belt conveyor. The headland management system can be a component part of the control device or the other way round.

The outer belt conveyors can each be provided with a drive which causes them to move in the direction toward the central belt conveyor in harvesting mode, whilst the drive of the central belt conveyor causes the central belt conveyor to move rearward in the direction toward the feeder house in harvesting mode.

After a first time delay, which allows the harvested crop still located on the outer belt conveyors to be discharged onto the feeder house prompted by a raising of the feeder house, the control unit can be operable to stop or to reverse the drive of the central belt conveyor. Alternatively, after a second time delay which allows harvested crop accumulated below the central belt conveyor to be discharged, the control unit can instruct the drive of the central belt conveyor to terminate the reversing operation of the central belt conveyor.

The feeder house can be connected to a drive which is operable to remain in conveying mode after a raising for at least a time which suffices to convey harvested crop conveyed from the outer belt conveyors into the combine harvester. Shutting down the feeder house at the headland is certainly conceivable but not necessary.

The drives of the outer belt conveyors can be connected to the control unit and the control unit can be operable to shut down the drives of the outer belt conveyors after a raising of the feeder house for a time period which allows the harvested crops located on the outer belt conveyors to be discharged onto the central belt conveyor. In the case of another embodiment, the outer belt conveyors can also remain in their normal harvesting mode at the headland.

The control unit can be operable to cause the drive of the central belt conveyor to move into a harvesting mode again in the event of a lowering of the feeder house.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
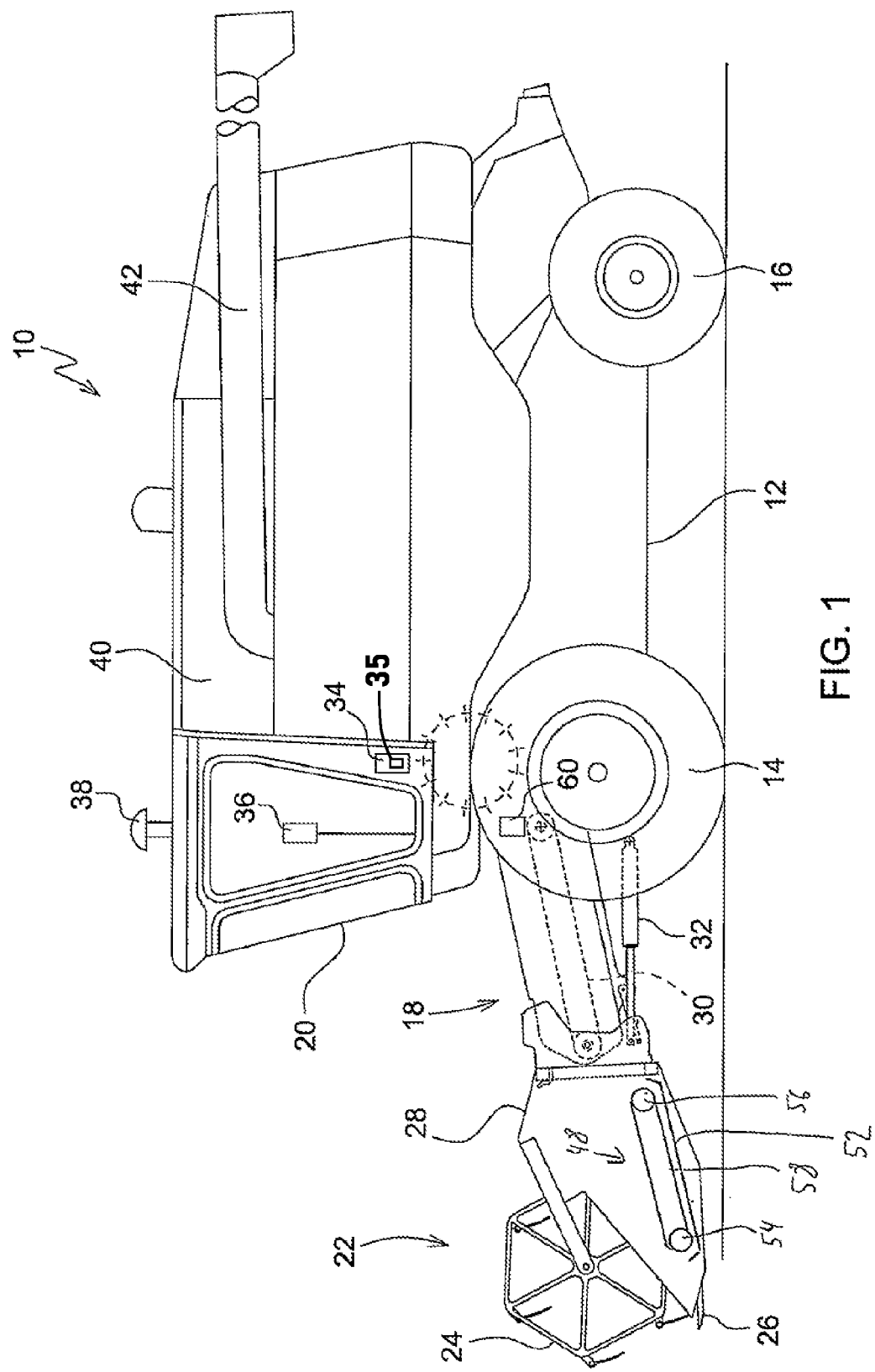
FIG. 1 is a schematic side view of a combine harvester with a draper belt header attached to the feeder house.

FIG. 1 shows a schematic representation of a side view of a combine harvester 10. The combine harvester 10 includes a chassis or bearing structure 12 which is supported on the ground on driven front wheels 14 and steerable rear wheels 16 and is movable over a field. Caterpillar drives could also be used in place of the wheels 14, 16.

A feeder house 18 is mounted on the front side of the chassis or bearing structure 12 and a draper belt header 22, which incudes a reel 24, a cutter bar 26 and a bearing frame 28, is coupled in turn on the front side of the feeder house so as be removable.

A cabin 20 is mounted on the chassis or bearing structure 12 above the front wheels 14. The feeder house 18 includes a conveyor 30 and is pivotable by an actuator 32 in relation to the chassis or bearing structure 12 of the combine harvester 10 about an axis which extends horizontally and transversely to the forward direction and may coincide with the rotational axis of the upper guide roller of the conveyor 30 in order to be able to modify the height of the draper belt header 22 (or of an arbitrary other harvest attachment mounted on the feeder house 18 in place of the draper belt header 22) above the ground for adapting the working height of the draper belt header 22 and to be able to raise this latter at the end of the field (at the headland). For this purpose, the actuator 32 is connected to a control unit 34 which, in turn, is coupled with an operator interface 36 and a position determining device 38.

A threshing and separating device and a cleaning device are arranged in the interior of the bearing structure or chassis 12. The cleaned grain is stored intermediately in a grain tank 40 and can be loaded onto a transport vehicle by an unloading conveyor 42.

Figure 2:
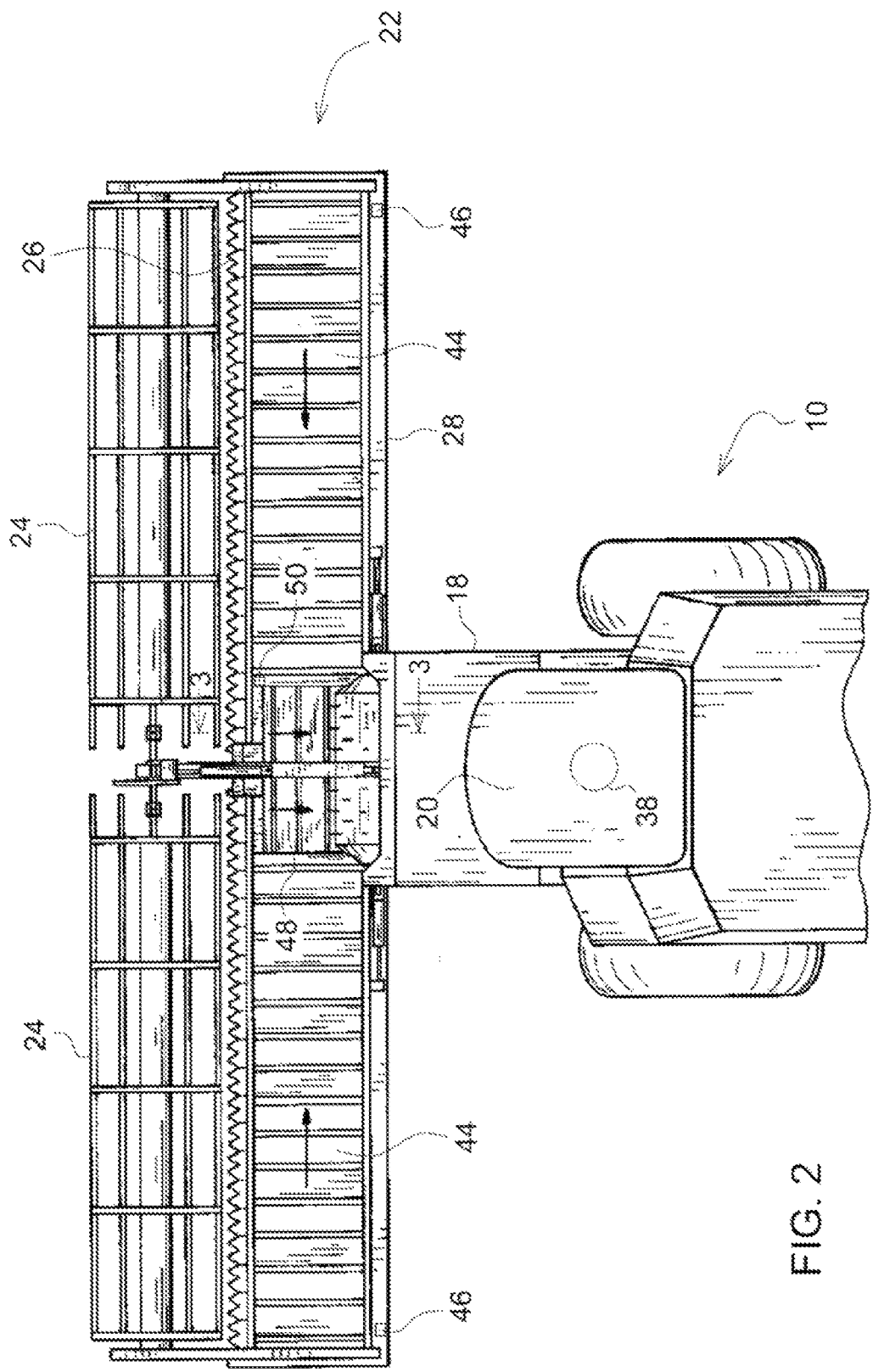
FIG. 2 is a top view of the front region of the combine harvester of FIG. 1 and the draper belt header.

Referring to FIG. 2, a top view is shown of the front region of the combine harvester 10 and of the draper belt header 22. The draper belt header 22 includes two outer belt conveyors 44 each connected to a drive 46 which drives them in harvesting mode in such a manner that their top sides move inward, as shown by the arrows, in order to convey the harvested crop which is captured by the reel 24 and severed by the cutter bar 26 to the center of the draper belt header 22, where it is taken over by a central belt conveyor 48 driven by a drive 50 which is associated thereto, and is transported away rearward into the feeder house 18.

Figure 3:
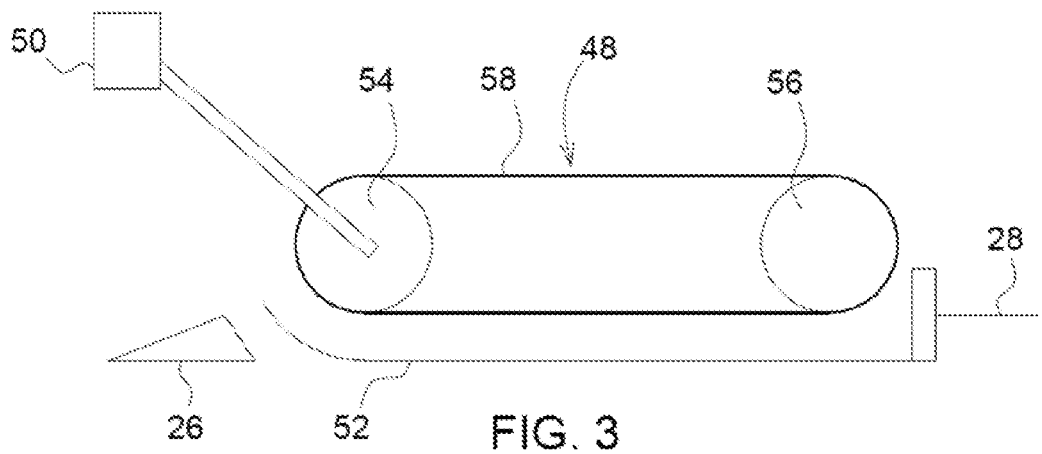
FIG. 3 is a vertical section through the draper belt header along the line 3-3 in FIG. 2.

Referring to FIG. 3, a vertical section is shown through the central belt conveyor 48 along the forward direction of the combine harvester 10. The central belt 48 includes a conveyor belt 58 which circulates about two guide rollers 54, 56, one of which is coupled with the drive 50. The drive 50 may also drive the rear guide roller 56 in place of the front guide roller 54. A pan 52, in which harvested crop accumulates in harvesting mode from which certain quantities are continuously output forward by the central belt conveyor 48 but are entrained rearward again by the incoming harvested crop and are consequently not lost, is arranged below the lower, returning run of the conveyor belt 58. However, the quantities of harvested crop can drop onto the field if no or only very little harvested crop comes in from the front at the headland or if there are gaps in the crop.

Figure 4:
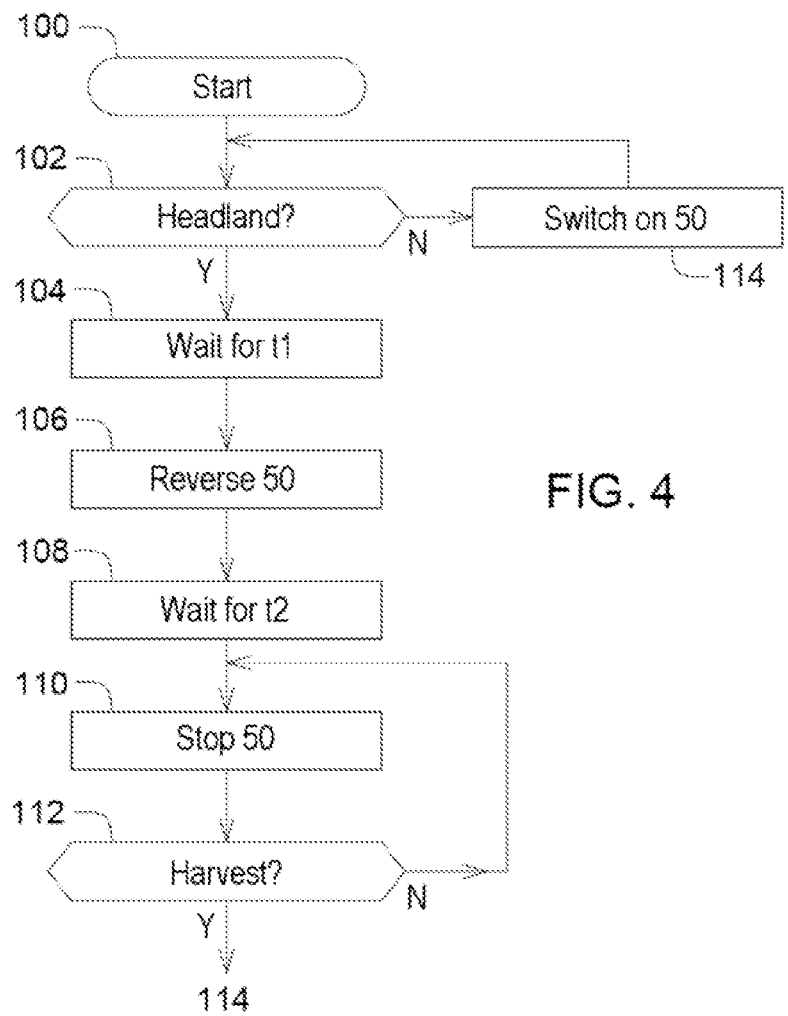
FIG. 4 is a flow diagram according to which the control unit of the combine harvester operates.

The drives 46 and 50 (which may be, for example, as electric or hydro drives or reversible and disconnectable mechanical drives) are operably connected to the control unit 34 which operates in harvesting mode according to the flow diagram in FIG. 4. After the start in step 100, the control unit 34 may determine if the combine harvester 10 is in a headland mode, where the draper belt header 22 has been moved out of a lowered harvesting position into a raised headland position (or has been raised for other reasons, e.g., in order to avoid taking in weeds). To this end, the position of the combine harvester 10 can be detected in accordance to one of several ways. For example, the position may be detected by a signal from the satellite-based position determining system 38 and a map of the field stored prior to the harvesting operation or during the harvesting operation. Alternatively, the position may be detected by the inputs into the operator interface 36 whether the operator has caused the draper belt header 22 to be raised by the actuator 32. Moreover, the position may be detected based on the position of the actuator 32 or of an element moved by the same which may be detected with a sensor 60, a sensing device, or the control unit 34 which receives corresponding data from an automatic headland management system 35 which automatically gives rise to a headland sequence of the combine harvester 10 at the headland.

If the draper belt header 22 is not in a headland mode, the step 114 follows in which the drive 50 of the central belt conveyor 48 is switched on. In the case of harvesting mode, the drives 46 of the outer belt conveyors 44, of the conveyors 30 of the feeder house 18 and the threshing and separating device as well as the cleaning device of the combine harvester 10 are operational. They can remain switched on at the headland or can be switched off or driven in a slower manner after the corresponding times (where applicable different), which are sufficient to process the entire harvested crop taken in by the draper belt header 22 prior to the start of the headland operation (and that which is conveyed in the step 106) in the combine harvester 10. The step 114 is followed by step 102 again.

If the result of the step 102 is that the combine harvester 10 is in headland mode, this is followed by step 104 in which there is a wait for a time t1 during which the drive 50 drives the belt conveyor 50 at the previous speed, which also applies analogously to the drives 46 which drive the outer belt conveyors 44 at the speed used during the harvesting operation, and to the drive of the feeder house 18. The time t1 is chosen in such a manner that the entire harvested crop (which rests on the central belt conveyor 48 and the outer belt conveyors 44), taken in by the draper belt header 22 prior to the start of the headland operation, is output by the central belt conveyor 48 into the feeder house 18 and no more freshly taken-in harvested crop lies on the belt conveyors 44, 48. After step 104, the control unit 34 causes the drive 50 to reverse, i.e., to drive the roller 54 in the direction opposite to the harvesting mode. As a result, the harvested crop, which has accumulated in the pan 52 below the returning run of the conveyor belt 58, is conveyed away to the rear and taken over by the feeder house 18 which continues to run. The reversing mode after step 106 is carried out according to step 108 for a time t2 which is sufficient to convey the harvested crop away out of the pan 52.

In a different embodiment, the control unit 34 may instruct the drive 50 in step 106 to stop the central belt conveyor 48. This also prevents the harvested crop, which has accumulated under the central belt conveyor 48, from being output forward. It is also conceivable to stop the central belt conveyor 48 first of all for a certain time in the step 106 and only then reverse it.

In the following step 110, the drive 50 is stopped and in step 112 interrogated as to whether the harvesting mode has been resumed again. If this is the case, step 114 follows again (in which the drives 46 which were disconnected, where applicable, and the feeder house 18 and the threshing and separating and cleaning device of the combine harvester 10 are switched on again) and otherwise step 110.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An arrangement for controlling the operation of a draper belt header of a combine harvester, comprising:
a central belt conveyor of the draper belt header including a drive for operably driving the central belt conveyor;
two outer belt conveyors attached to a feeder house of the combine harvester, the feeder house comprising an adjustable height;
an actuator for controllably adjusting the height of the feeder house; and
a control unit operable to stop the drive of the central belt conveyor or move it into a reversing mode if the feeder house is being raised by the actuator.

2. The arrangement of claim 1, wherein the actuator is operable to raise the feeder house out of a working position into a headland position.

3. The arrangement of claim 2, wherein the control unit is operable to stop the drive of the central belt conveyor or move it into the reversing mode if the feeder house is raised into the headland position.

4. The arrangement of claim 1, wherein the control unit operably actuates the drive based on an adjustment command given manually to the actuator.

5. The arrangement of claim 1, wherein the control unit operably actuates the drive based on a position of the feeder house detected by a sensor.

6. The arrangement of claim 1, wherein the control unit operably actuates the drive based on an output of a headland management system.

7. The arrangement of claim 1, wherein:
the outer belt conveyors each include a drive for moving in a direction towards the central belt conveyor in a harvesting mode; and
the drive of the central belt conveyor operably moves the central belt conveyor in a direction toward the feeder house in the harvesting mode.

8. The arrangement of claim 7, wherein, after a first time delay, harvested crop located on the outer belt conveyors is discharged into the feeder house prompted by a raising of the feeder house and the control unit is operable to stop or reverse the drive of the central belt conveyor.

9. The arrangement of claim 8, wherein, after a second time delay, harvested crop which has accumulated below the central belt conveyor is discharged and the control unit instructs the drive of the central belt conveyor to terminate the reversing operation of the central belt conveyor.

10. The arrangement of claim 7, wherein the feeder house is connected to another drive which is operable in a conveying mode after a raising of the feeder house for at least a time period in which harvested crop is conveyed by the outer belt conveyors into the combine harvester.

11. The arrangement of claim 7, wherein:
the drives of the outer belt conveyors are connected to the control unit; and
the control unit is operable to shut down the drives of the outer belt conveyors after a raising of the feeder house for a time period which allows the harvested crops located on the outer belt conveyors to be discharged onto the central belt conveyor.

12. The arrangement of claim 1, wherein the control unit is operable to control the drive of the central belt conveyor to move into a harvesting mode in the event of a lowering of the feeder house.

13. A combine harvester, comprising:
a feeder house mounted to a chassis;
a draper belt header;
a central belt conveyor including a drive for operably driving the central belt conveyor;
two outer belt conveyors attached to the feeder house of the combine harvester, the feeder house comprising an adjustable height;
an actuator for controllably adjusting the height of the feeder house; and
a control unit operable to stop the drive of the central belt conveyor or move it into a reversing mode if the feeder house is being raised by the actuator.

14. The combine harvester of claim 13, wherein the actuator is operable to raise the feeder house out of a working position into a headland position, or the control unit is operable to stop the drive of the central belt conveyor or move it into the reversing mode if the feeder house is raised into the headland position.

15. The combine harvester of claim 13, wherein the control unit operably actuates the drive based on an adjustment command given manually to the actuator, a position of the feeder house detected by a sensor, or an output of a headland management system.

16. The combine harvester of claim 13, wherein:
the outer belt conveyors each include a drive for moving in a direction towards the central belt conveyor in a harvesting mode; and
the drive of the central belt conveyor operably moves the central belt conveyor in a direction toward the feeder house in the harvesting mode.

17. The combine harvester of claim 16, wherein:
after a first time delay, harvested crop located on the outer belt conveyors is discharged into the feeder house prompted by a raising of the feeder house and the control unit is operable to stop or reverse the drive of the central belt conveyor; or
after a second time delay, harvested crop which has accumulated below the central belt conveyor is discharged and the control unit instructs the drive of the central belt conveyor to terminate the reversing operation of the central belt conveyor.

18. The combine harvester of claim 16, wherein the feeder house is connected to another drive which is operable in a conveying mode after a raising of the feeder house for at least a time period in which harvested crop is conveyed by the outer belt conveyors into the combine harvester.

19. The combine harvester of claim 16, wherein:
the drives of the outer belt conveyors are connected to the control unit; and
the control unit is operable to shut down the drives of the outer belt conveyors after a raising of the feeder house for a time period which allows the harvested crops located on the outer belt conveyors to be discharged onto the central belt conveyor.

20. A control system for controlling the operation of a draper belt header of a combine harvester, comprising:
a central belt conveyor of the draper belt header including a drive for operably driving the central belt conveyor;
a pair of belt conveyors disposed on each side of the central belt conveyor, the pair of belt conveyers attached to a feeder house of the combine harvester, wherein the feeder house comprises an adjustable height;
an actuator for controllably adjusting the height of the feeder house; and
a control unit operable to stop the drive of the central belt conveyor or move it into a reversing mode if the feeder house is being raised by the actuator;
wherein, the belt conveyors each include a drive for moving in a direction towards the central belt conveyor in a harvesting mode;
wherein, the drive of the central belt conveyor operably moves the central belt conveyor in a direction toward the feeder house in the harvesting mode.

* * * * *